Dec. 20, 1932. W. A. FLUMERFELT 1,891,804
JOINT CONSTRUCTION
Filed Feb. 10, 1931
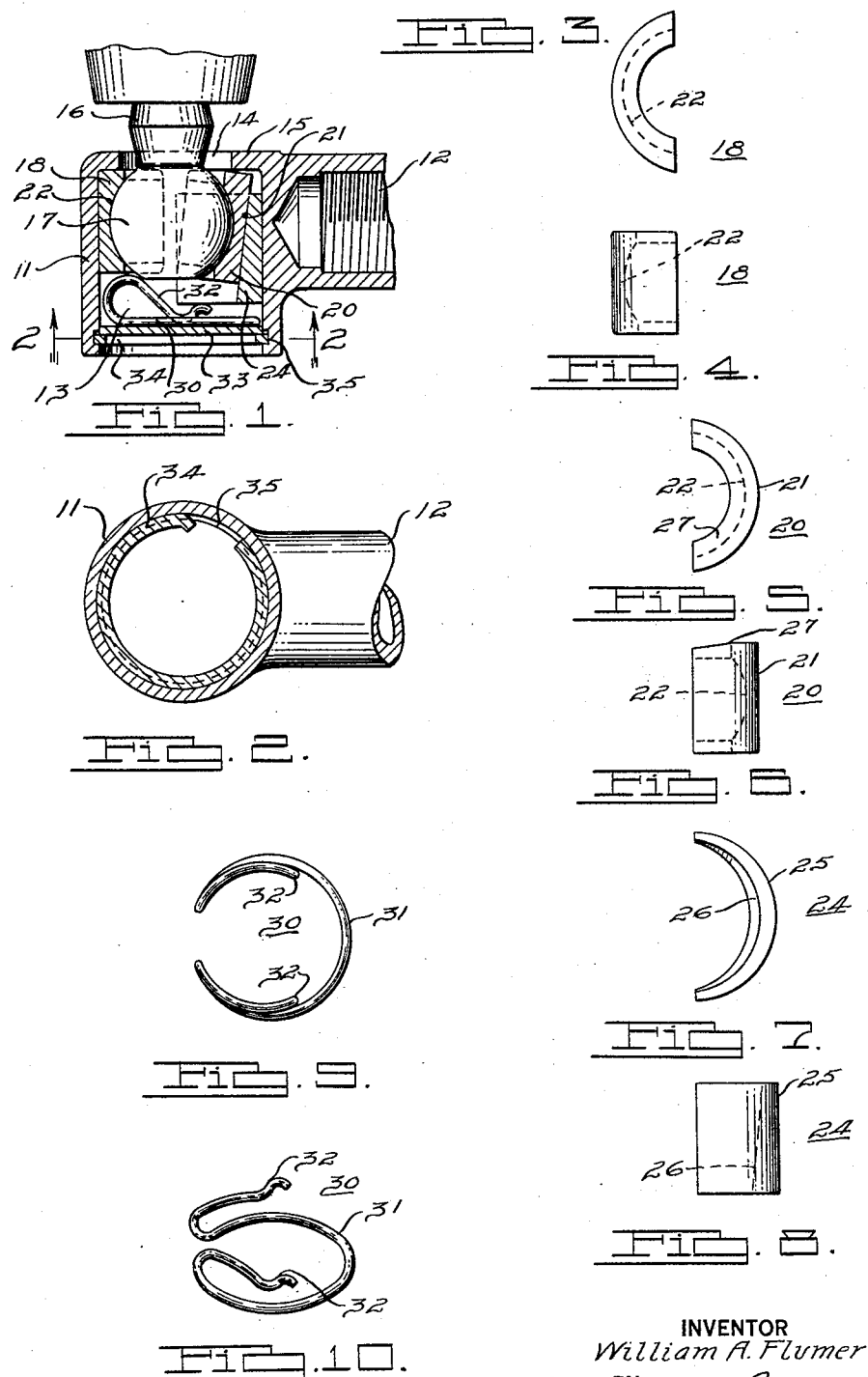
INVENTOR
William A. Flumerfelt.
BY
Harness, Dickey, Pierce & Hann,
ATTORNEYS.

Patented Dec. 20, 1932

1,891,804

UNITED STATES PATENT OFFICE

WILLIAM A. FLUMERFELT, OF COLUMBUS, OHIO, ASSIGNOR TO THE COLUMBUS AUTO PARTS COMPANY, A CORPORATION OF OHIO

JOINT CONSTRUCTION

Application filed February 10, 1931. Serial No. 514,810.

My invention relates to joints and particularly to a joint of the ball and socket type.

The main objects of this invention are to provide an improved ball and socket joint which will be automatically self adjusting to compensate for wear therein; to provide a construction of such joint in which the adjustment of the socket to compensate for wear is accomplished without changing the position of the ball relative to the enclosing housing longitudinally thereto; to provide a construction in which a uniform bias is present at all times between the surfaces of the member that goes to make up the joint; and to provide a construction which may be economically manufactured and easily and readily assembled.

Numerous other objects and features and novelty of my invention will be either specifically pointed out or will become apparent when referring, for a better understanding of my invention, to the following description in conjunction with the accompanying drawing wherein:

Figure 1 is a view, partly in section and partly in elevation, of a ball joint embodying features of my invention, Figure 2 is a view of the structure shown in Fig. 1 taken along the line 2—2 thereof, Figures 3 to 8 inclusive are plan and elevational views of elements which go to make up the structure shown in Fig. 1, Figure 9 is a top plan view of a spring employed in the structure shown in Fig. 1 and Figure 10 is a prospective view of the spring shown in Fig. 9.

In the co-pending application of John B. Milligan Serial Number 447,460, filed April 26th, 1930, and assigned to the assignee of the present invention, a ball and socket joint is disclosed having adjustable means for retaining the engaging elements of the ball in firm relation thereto, irrespective of the amount of wear between the ball and the engaging elements. By employing two of the ball engaging elements and wedges the movement of the elements by the wedges will be uniform with respect to the enclosing housing and the ball will be retained at all times in centrally aligned relation.

Where the central alignment of the ball with respect to the housing is not of particular importance, and where the clearance between the end of the housing and an adjacent member is to be reduced to a minimum, I eliminate one of the ball engaging elements and its actuating wedge and substituting therefor a socket element which fits snugly within the enclosing housing, which reduces the distance between the ball and housing a thickness at least equal to that of the wedge. In this construction, the adjustment of the joint occurs as the other ball engaging element is moved by the single wedge member which is bias between the element and the wall of the housing by a spring which is retained within the lower confines of the housing.

Referring more particularly to Figures 1 and 2, my invention comprises an outer housing member 11 having a hollow interiorly threaded shank 12 thereon for receiving a tie rod or the like and an aperture 13 which is disposed at right angles to the threaded shank 12. The aperture 13 is cylindrical in shape and is aligned with an aperture 14 formed by an inturned flange 15 provided at the upper end of the aperture through which projects a shank 16 integrally formed on an inner bearing member or ball 17.

The ball 17 is positioned within the aperture 13 and is embraced on one side by a socket member 18 which is of semi-cylindrical shape on its inner and outer surface. The outer surface is of a radius substantially equal to the radius of the aperture 13 and the inner surface is of a radius less than the radius of the ball 17 to permit it to be recessed, as at 22, to receive substantially one-half of the surface of the ball. The radii are provided with offset centers to decrease the thickness of the member 18 as shown in Fig. 3.

The other half of the aperture 13 is provided with an inner intermediate or socket member 20 which has an outer surface 21 formed on a uniform radius so as to be substantially semi-cylindrical in shape.

The inner surface of the socket member 20 is provided with a ball seat recess 22 concentrically formed with respect to the outer cylindrical side. Figures 4 and 5 disclose the socket elements 18 and 20, both of the members being provided with similar inner surfaces constituting ball seat recesses 22 and both having outer semi-cylindrical surfaces. The surface of the socket member 18 is of a radius substantially equal to that of the aperture 13 in the housing 11 while the radius of the surface 21 of the member 20 is less to provide a space between the surface and the wall of the aperture 13.

In Figures 1, 7 and 8 I have illustrated means for tightening the socket member 20 around the ball 17 which comprises an outer intermediate or wedge member 24 having an outer surface 25 which is formed on a uniform radius providing a surface substantially semi-cylindrical in shape which conforms to the shape of the wall of the aperture 13, in the housing. An inner surface 26 on the wedge member 24 is also of cylindrical shape of a radius substantially equal to the radius of the surface 21 on the socket 20. The axes of the surfaces 25 and 26 of the wedge member 24 are angularly disposed with respect to each other, thus forming a wedge member having an inner and outer cylindrical wall, the inner surface of which supports the socket member 20 in an upward, outwardly slanting or diverging position as shown in Fig. 1 of the drawing.

The socket member 20 is trimmed on its top edge as shown at 27 in Fig. 6 to provide an engaging surface which abuts against the inturned flange 15 when forced upwardly within the opening 13 of the housing.

In Figures 9 and 10 I have disclosed a spring 30 which comprises an annular shaped body portion 31 having arms 32 bent backwardly in the plane of the body portion as shown in Figure 9. The spring 30 is supported within the lower portion of the opening 13 by a circular plate 33 which is retained within the opening by the expandable spring lock ring 34 seated in a groove 35 formed around the inner periphery of the opening, closely adjacent to its lower end, as shown more clearly in Figs. 1 and 2. The arms 32 of the spring engage the bottom of the wedge member 24 to bias it upwardly between the surface of the opening 13 and the surface 21 of the ball socket member 20.

A lubricating fitting (not shown) may be provided on the side of the housing or on the plate 33 in communication with the hollow opening for the purpose of supplying a lubricant therewithin in contiguity with the engaging surfaces. A suitable cover (not shown) for the aperture 14 may be provided about the shank 16 for the purpose of preventing dust or other abradment from accumulating within the opening and also for preventing the lubricant from being forced out of the housing through the aperture.

The ball and socket joint is assembled as shown in Fig. 1 with the socket members 18 and 20 abutting against the inturned flange 15 to thereby position the ball within the housing with relation to the threaded shank 12. The wedge member 24 is inserted through the bottom of the aperture 13 and when snugly contacting with its wall and the outer surface 21 of the socket member 20, forces the socket members into firm engagement with the ball and causes the socket member 20 to be tilted slightly to have the flat trimmed surface 27 engage the inner surface of the flange 15.

When wear occurs between the surface of the ball 17 and the inner surface of the socket member 18 and 20, the wedge member 24 will be automatically moved upwardly or axially relative to the socket member by the bias of the spring 30 and cause the socket member 20 to tighten or close-in radially around the ball 17 to thereby cause the inner surface of the socket members to be retained in engagement with the ball with a constant pressure irrespective of the amount of wear occurring between their engaging surfaces.

By reason of fact that the outer surface of the socket member 20 is formed on a radius which is substantially the same as the radius of the inner surface of the wedge member 24, a complete engagement between the two surfaces will be at all times retained irrespective of how far the wedge member 24 may travel upwardly in the housing.

It will thus be seen that I have provided a joint of the self-adjusting type which provides substantially the same clearance from a member as joints now employed in the art of the non-adjustable types. I accomplish this result by providing a socket for engaging the housing and ball, of a thickness which is no greater than that of sockets on the non-adjustable joint and mount the socket in the side of the housing where clearance is to be provided. Suitable means, such as a pin, may be employed to prevent the socket from moving relative to the housing.

When the side has been predetermined, where the clearance is to be provided, the hole bounded by the inturned flange may be in offset relation to the housing in the direction of the side, to permit the employment of a smaller hole and ball which further reduces the dimension of the housing at the offset side.

While I have described and illustrated but a single embodiment of my invention, it will be apparent to anyone skilled in the art that many changes, omissions, additions and substitutions may be made therein without departing from the spirit and scope of my invention as set forth in the accompanying claims.

I claim as my invention:

1. A housing having a cylindrical aperture provided with an inturned flange at one end forming an opening to said aperture, a ball within said aperture having a stem extending through said opening, a socket on one side of said ball abutting against said flange and offsetting said ball within said aperture, a second socket engaging the other side of said ball and spaced from the wall of said aperture, a wedge within said space for forcing the socket into engagement with said ball and a spring having a turn disposed in a plane with the ends thereof bent back upon the turn forming arms for engaging the bottom of said wedge.

2. A housing having a cylindrical aperture provided with an inturned flange at one end forming an opening to said aperture, a ball within said aperture having a stem extending through said opening, a socket on one side of said ball abutting against said flange and offsetting said ball within said aperture, a second socket engaging the other side of said ball and spaced from the wall of said aperture, a wedge having an inner and outer semi-cylindrical surface disposed in angular relation longitudinally of its length and means for biasing said wedge into said space comprising a spring having a turn disposed in a plane with the ends thereof bent back upon the turn, for providing arms which engage the bottom of said wedge.

3. The combination with a spring for biasing a wedge between a ball engaging socket and the wall of an aperture of a retaining housing comprising a single turn disposed in a plane having its end portions bent back upon the turn to provide arms for engaging the bottom of said wedge, of supporting means for said turn and means for retaining said supporting means within the confines of said aperture.

WILLIAM A. FLUMERFELT.